US010436880B2

(12) United States Patent
Hofmann et al.

(10) Patent No.: US 10,436,880 B2
(45) Date of Patent: Oct. 8, 2019

(54) APPLIANCE AND METHOD FOR DETECTING OBJECTS IN A DETECTION REGION

(71) Applicant: Fraunhofer-Gesellschaft zur Förderung der angewandten Forschung e.V., München (DE)

(72) Inventors: Ulrich Hofmann, Berlin (DE); Thomas von Wantoch, Kiel (DE); Christian Mallas, Schwentinental (DE); Frank Senger, Hardenfeld (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 414 days.

(21) Appl. No.: 15/267,731

(22) Filed: Sep. 16, 2016

(65) Prior Publication Data

US 2017/0082736 A1    Mar. 23, 2017

(30) Foreign Application Priority Data

Sep. 18, 2015  (DE) .................. 10 2015 115 798
Jan. 7, 2016   (DE) .................. 10 2016 200 109

(51) Int. Cl.
*G01S 7/481*   (2006.01)
*G01S 17/02*   (2006.01)
*G01S 17/93*   (2006.01)

(52) U.S. Cl.
CPC ......... *G01S 7/4817* (2013.01); *G01S 7/4814* (2013.01); *G01S 17/026* (2013.01); *G01S 17/936* (2013.01)

(58) Field of Classification Search
CPC ...... G01S 7/4817; G01S 7/481; G01S 7/4811; G01S 7/4812; G01S 7/4813; G01S 7/4814
See application file for complete search history.

(56) References Cited

U.S. PATENT DOCUMENTS 3,360,793 A   12/1967  Collis
3,811,774 A    5/1974  Honeycutt et al.
(Continued)

FOREIGN PATENT DOCUMENTS

DE         10323317 A1    12/2004
DE    102006025020 A1    11/2007
(Continued)

*Primary Examiner* — Eric L Bolda
(74) *Attorney, Agent, or Firm* — Schwegman Lundberg & Woessner, P.A.

(57) ABSTRACT

The invention relates to an appliance for detecting objects in a detection region, with a radiation device for emitting an electromagnetic scanning beam into at least a part of the detection region and with a device for modulating the scanning beam as well as with a detection device for the detection of reflected radiation from at least a part of the detection region and with a device for evaluating the time response of the detected, reflected radiation, in dependence on the modulation of the scanning beam.

Figure 1:
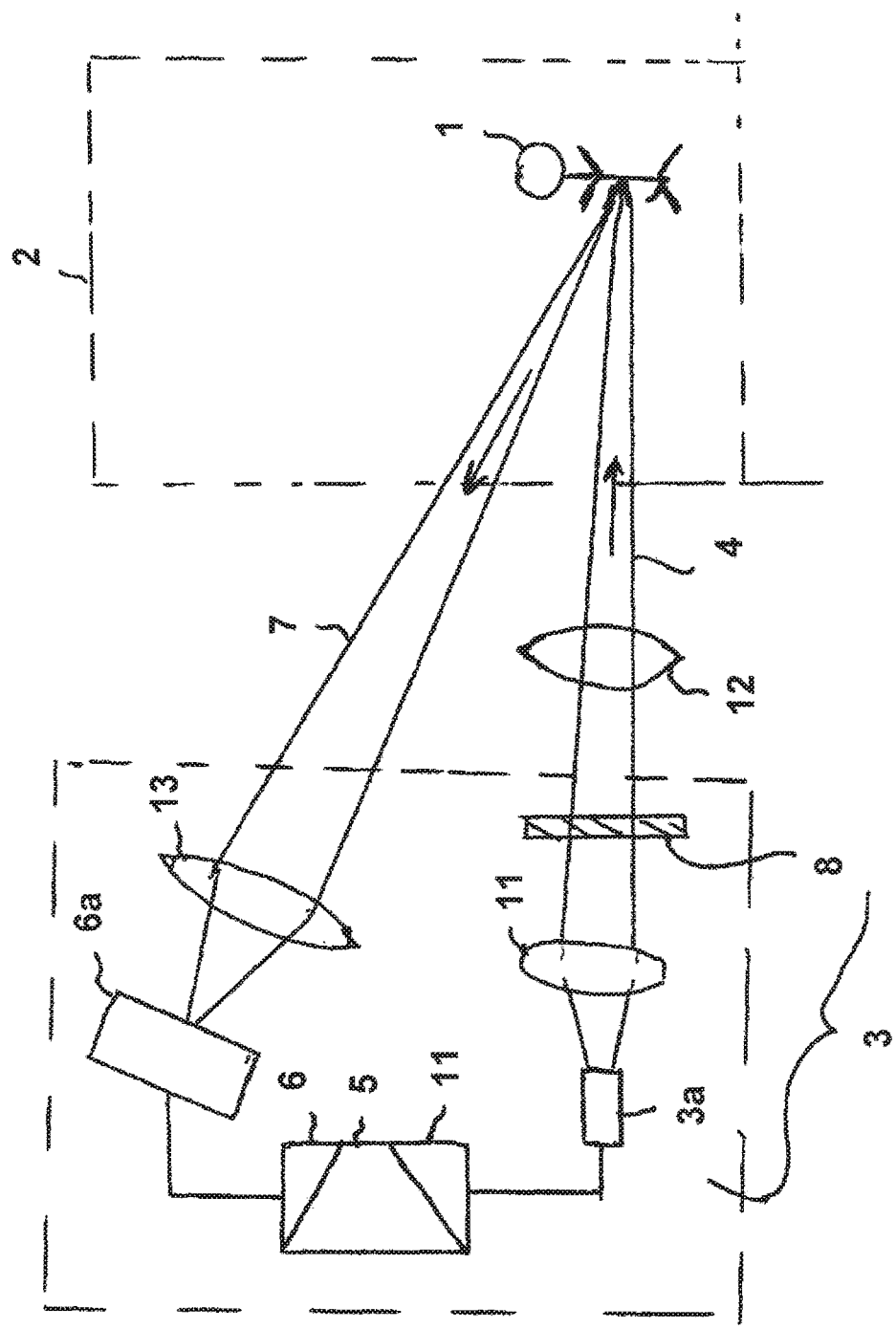

According to the invention, one can envisage the radiation device comprising a radiation source radiating a diffusion device scattering the radiation at least partly into the detection region, in order to be able to apply an as powerful as possible laser as a t source without endangering the eye safety or the general safety of persons.

16 Claims, 3 Drawing Sheets

(56) References Cited

U.S. PATENT DOCUMENTS

| | | | |
|---|---|---|---|
| 6,944,544 B1* | 9/2005 | Prakah-Asante | B60R 21/0134 342/42 |
| 8,072,581 B1 | 12/2011 | Breiholz | |
| 2008/0309914 A1 | 12/2008 | Cantin et al. | |
| 2010/0191418 A1 | 7/2010 | Mimeault et al. | |
| 2011/0249460 A1* | 10/2011 | Kushimoto | B60Q 1/085 362/510 |
| 2013/0058114 A1* | 3/2013 | Reiners | F21S 41/16 362/510 |
| 2013/0190971 A1* | 7/2013 | Anderson | B60Q 1/085 701/36 |
| 2013/0250273 A1 | 9/2013 | Ludwig | |
| 2013/0314896 A1* | 11/2013 | Finsterbusch | G03B 21/204 362/84 |
| 2015/0137680 A1 | 5/2015 | Komatsu et al. | |
| 2015/0168555 A1 | 6/2015 | Herschbach | |
| 2016/0011311 A1* | 1/2016 | Mushimoto | G02B 26/0816 250/236 |
| 2017/0357004 A1* | 12/2017 | Puente | G01S 17/32 |

FOREIGN PATENT DOCUMENTS

| | | |
|---|---|---|
| DE | 102008064652 B4 | 3/2014 |
| EP | 2124069 A1 | 11/2009 |
| WO | WO-2015000006 A1 | 1/2015 |

* cited by examiner

APPLIANCE AND METHOD FOR DETECTING OBJECTS IN A DETECTION REGION

CLAIM FOR PRIORITY

This application claims the benefit of priority of German Application No. 10 2015 115 798.5, filed Sep. 18, 2015 and German Application No. 10 2016 200 109.4, filed Jan. 7, 2016; which applications are incorporated herein by reference in their entirety.

The invention lies in the field of physics and electro-technology and can be applied in all areas, in which objects are to be detected at different distances in a contact-free manner and without a direct physical interaction.

The invention for example can be applied in the field of motor vehicle technology, but also in other transport means, such as aircraft and ships for example, wherein information concerning objects in the vicinity of the respective transport means is important and should therefore be acquired when operating such transport means. The invention can moreover also be used for the surveillance of buildings and properties, in order to detect approaching persons or transport means.

The invention specifically relates to an appliance with a radiation device as well as with a detection device for the detection of reflected radiation.

Such appliances are basically already known from the state of the art in various embodiments. Radar and lidar systems which also permit the measurement of distances of objects in the detection region to the respective location of the system and well as a three-dimensional acquisition (detection) of the environment are counted as belonging to such embodiments.

Such types of lidar systems usually use lasers as radiation sources. With lidar systems (lidar=light detection and ranging), lasers are applied for illuminating objects to be detected, wherein the scattered-back or reflected light is detected and a distance is computed from the time-of-flight of the signals (light propagation time). An intensity-modulated laser which is operated according to a periodic function with respect to the amplitude modulation or pulse distribution can also be applied instead of individual laser impulses, wherein the reflected signal is compared to the emitted signal with respect to the phase shift, and the time-of-flight (time of arrival) differences are determined from this. Here, it is necessary to be able to select an adequately high modulation frequency, in order to achieve adequate detection accuracy.

Corresponding lidar solutions are also already known from patent literature. Thus for example the US patent document U.S. Pat. No. 8,072,581 B1 discloses a special lidar system for distance measurement. Deflection optics for a laser system of a lidar are known from the US patent document U.S. Pat. No. 5,006,721 A, Wherein this system permits a scanning of the surface of an object.

A lidar system with a $CO_2$ laser which permits a location detection of an object as well as a speed measurement is known from the US patent document U.S. Pat. No. 3,811,774.

A lidar system which strives for an improvement of the signal-to-noise ratio by way of a special evaluation is known from the US patent application US 2013/0250273 A1.

A lidar system which permits a detection of objects in a wide solid angle region by way of mirroring or reflecting the emitted laser beam into different directions and a locally resolved detection of the reflection signal is known from the European patent application EP 2 124 069 A1.

U.S. Pat. No. 3,360,793 finally basically represents a lidar system for the application in aviation.

Herein, common to all known systems is the fact that a laser is applied as a radiation source. This is particularly important due the fact that the maximal distance, at which an object can be detected with such a system, is dependent on the total signal intensity which is reflected by the object and detected by the receiving optics of the reflection signal. The intensity moreover depends on the reflectivity of the surface of the object to be detected. At all events, the radiation with a laser permits a high radiation and reflection intensity, even over a large distance, due to the good focussing.

However, it is particularly the safety of persons and especially the protection of the eyes which must be considered when using such lidar systems, to the extent that the laser intensity of the emitted radiation is limited. This can be compensated only partially by enlarged sensors, even with the detection of the reflected signal, due to the fact that the construction space for such as sensor or focussing optics is limited. The detection of the reflected signals should moreover be effected in a locally resolved manner, which is why scanners for the selective detection of part-solid-angles are often used at the receiver side, wherein the construction size of these scanners is likewise limited.

Against the background of the state of the art, it is therefore the object of the present invention, to provide a detection system with an as large as possible range and local resolution of the detected objects, whilst simultaneously taking into account the safety of persons and with a small installation space.

With regard to an appliance, the object is achieved with the features of the invention according to patent claim 1. Patent claim 13 specifies a method for achieving the object. The respective dependent claims specify exemplary embodiments of the invention.

Accordingly, the invention relates to an appliance for detecting objects in a detection region, with a radiation device for emitting at least one electromagnetic scanning beam into at least a part of the detection region and with a device for modulating the scanning beam, as well as with a detection device for the detection of reflected radiation from at least a part of the detection region and with a device evaluating the time response of the detected reflected radiation in dependence on the modulation of the scanning beam.

The objects is specifically achieved by way of the radiation device comprising at least one radiation source in form of a laser light source which radiates a diffusion device scattering the radiation at least partly into the detection region, and by way of a separate illumination radiation device being provided, said illumination radiation device likewise comprising a laser light source, whose light is scattered at the diffusion device, wherein the diffusion device comprises a layer with a photo-luminescent material and is arranged in a light beamer housing.

The described embodiment has the effect that on the one hand a laser with a high output power and a good focussing ability can be used as a radiation source. The monochromatic laser light is converted by way of the diffusion device into a mixture of at least partly incoherent light beams which are different with regard to the wavelength. The wavelength region of the scattered secondary light depends on the incident radiation wavelength as well as on the material of the diffusion device. The scattered light (secondary light) firstly is significantly less dangerous to the eyes of living beings, in particular humans, by way of this, so that one can operate with high light intensities. Such light sources are already known in the field of automobiles, where, in the context of powerful automobile headlights, blue or violet laser light is used for illuminating a phosphor disc which scatters the light in the forwards direction and converts it into a white to yellow light mixture in the visible spectral range. The scattering in the forwards direction, i.e. in the incident radiation direction of the radiating laser is sufficiently well and tightly bundled, so that an illumination of objects, for example of a vehicle, is still possible at a few hundred meters distance and the reflected light intensity for detection is possible with a relatively small sensor.

Hence an intensity of the illumination which is very high compared to other available radiation sources can be provided by the suggested appliance, with a low spatial requirement and with a limited technical effort, wherein the eye safety and other safety of living beings in the detection region is simultaneously ensured. Herein, a reflecting diffusion disc with phosphor compounds, in particular with fluorescing substances can be used instead of a forwards scattering by way of a transparent diffusion device. The radiation device can be provided in or on a light beamer housing (headlight housing in the more specific case of a vehicle) or its light can be led into a light beamer housing by way of one or more fibre optics. The illumination radiation device which in the case of a motor vehicle can serve for the usual path illumination can also be arranged within the headlight housing as well as outside the housing, wherein this light can then also be led into the headlight housing and further to the diffusion device, by way of one or more fibre-optics. The respective electronic activation device can be arranged outside the housing if one of the laser light sources or both laser light sources are arranged within the headlight housing.

An exemplary embodiment of the invention can envisage the radiation device being configured for the selective illumination of one or several part-regions of the detection region by the scanning beam. The scanning beam can be successively steered over different regions of the solid angle of the detection region by way of this, and the reflected radiation measured in each case. The reflection intensity can thus be detected in dependence on the solid angle segment if the detector for the reflected radiation is coupled to a deflection device for the scanning beam, and this intensity evaluated, so that detected objects can be registered and can be verified with the solid angle, in which they are located, seen from the location of the appliance.

One can moreover envisage the radiation device being controllable in a manner such that it radiates in a targeted manner and exclusively one or more part-regions of the detection region. If the scanning beam is bundled to a sufficient extent, then the detection region can be scanned in a targeted manner with respect to the solid angle and with a desired resolution, wherein the reflection information in combination with the respective scanned solid angle in the detection region can be detected by the detector and stored, in order to obtain a three-dimensional image of the detection region. Herein, the radiation source, in particular the laser light source is modulated during the scanning procedure, in order, apart from the solid angle information, to also determine the respective distance to the appliance, by way of the time-of-flight (time of arrival) measurement. Herein, several lasers which can illuminate the different locations of the diffusion device can be simultaneously applied instead of a single laser light source, wherein several independent scanning beams arise, and these can also be defected differently for parallelisation, in order to accelerate a scanning procedure.

One can further envisage an MEMS scanner driving an optical element effecting a deflection or reflection of the scanning light beam being assigned to the radiation device for example. The direction of the scanning beam can be controlled by an MEMS scanner (micro-electromagnetic system), wherein this scanner can comprise one or more controllable micro-mirrors for the deflection of the beam. Such an MEMS scanner can for example be provided between the radiation source/the laser and the diffusion device, but basically also behind the diffusion device seen from the radiation source.

The advantage of the application of an MEMS scanner between the radiation source and the diffusion device lies in the fact that the radiation in this region is focussed to a significantly greater and narrower extent, so that the construction size of the scanner can be selected in a small manner.

The illumination radiation source can also direct its light beam onto a mirror device with steerable mirrors, in particular onto an MEMS scanner, in particular onto the same scanning device which also reflects the scanning beam. The illumination beam can steered in a targeted manner by way of this, in order for example to blank out detected objects on illumination, or to achieve a desired intensity distribution of the illumination beam.

One can also envisage the detection device being controllable in a manner such that it detects exclusively reflected radiation from one or more part-regions of the detection region in a targeted manner. In this case, the detection device can detect the spatial angle region, from which a reflection originates, wherein simultaneously the distance of the reflected object can be determined via the time-of-flight (time of arrival) measurement by way of comparison with the modulation of the scanning beam. If the complete detection region is hence illuminated simultaneously or bit by bit with regard to the solid angle in a scanning procedure, then the detection device on its own can assign a direction and a distance to the detected objects due to its local resolution.

The detection device for this can be controllable by way of an MEMS scanner, for the selection of part-region of the detection region.

The detection device can basically also comprise a detector array which operates in parallel, and this being the case with all embodiments.

Moreover, one can envisage the radiation device emitting the e scanning beam in the form of visible light and being part of a light beamer (of a headlight in a specific case). The already known high-power laser light beamers (headlights), for example with a phosphor diffusion disc, which are already known, can hence be simultaneously used in the field of automobiles for illuminating the surroundings and for detecting objects in the detection region. The pulsation and modulation of the laser is of such a high-frequency, that the light is perceived by the human eye as being continuous.

However, one can also envisage the radiation device radiating the scanning beam in the form of infrared light Moreover, one can envisage the radiation device emitting a light beam in the visible wavelength region, independently of the scanning beam, and this light beam being controllable, further in particular being controllable by way of an MEMS. The scanning beam can thus be identical to the beam for the illumination of the surrounding of the vehicle, thus can be applied for accomplishing the actual purpose of a headlight, but the scanning beam can also be used independently of the of such a beam. In both cases however, a region in which an object was detected can be excluded from the illumination, on account of the detection of objects in the detection region when illuminating the environment of a vehicle. This is particularly simply the case when the illumination beam is identical to the scanning beam, so that both can be controlled by way of a scanner. Solid angle regions, in which an oncoming vehicle or an oncoming person has been detected, as a result can be excluded from the illumination in this manner, in order to avoid a dazzling. However, one can also envisage an illumination beam as well as the scanning beam being controllable independently of one another by way of an MEMS device, in order on the one hand to detect objects in the detection region and on the other hand to be able to control the illumination of the detection region in a separate manner.

The radiation source, apart from a laser device in the form of one or more lasers, for example can also be designed as a laser diode or also as a light emitting diode.

Moreover, one can envisage the diffusion device comprising a layer, in particular a partly transparent solid matter layer which comprises a photo-luminescent material, in particular phosphor and/or one or more phosphor compounds. However, it is basically also possible to apply a solid matter layer whilst using other elements or also a gaseous layer between two transparent discs as well as a liquid or gel layer between transparent discs, as a diffusion device.

The invention, apart from an appliance of the explained type, also relates to a method for detecting objects in a detection region by way of emitting an electromagnetic scanning beam by way of an radiation device, into at least a part of the detection region, and by way of the detection of reflected radiation from at least a part of the detection region by way of a detection device and by modulating the scanning beam as well as by evaluating the time response of the detected reflected radiation in dependence on the modulation of the scanning beam, wherein a diffusion device is radiated by the one radiation source of the radiation device, and the radiation is scattered at least partly into the detection region.

Herein, one can envisage part-regions of the detection region being radiated successively in a targeted manner by way of a control of the scanning beam, and the reflection of radiation being simultaneously detected by the detection device.

However, alternatively or also additionally to this, one can envisage the detection region being radiated by the scanning beam, and the reflection of radiation from the detection region being simultaneously detected by the detection device in a direction-selective manner by way of a control of the detection focus.

Figure 2:
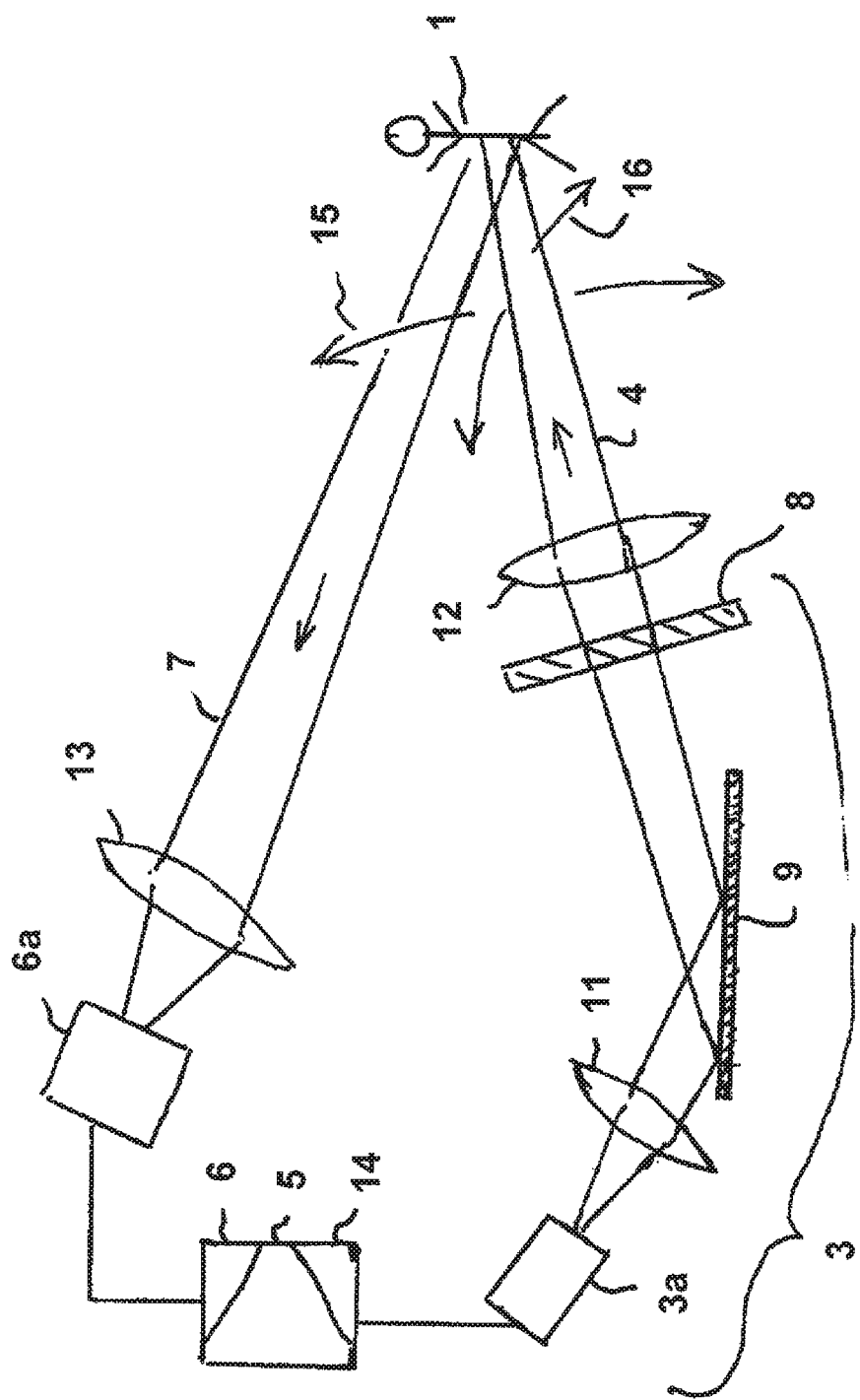
Figure 3:
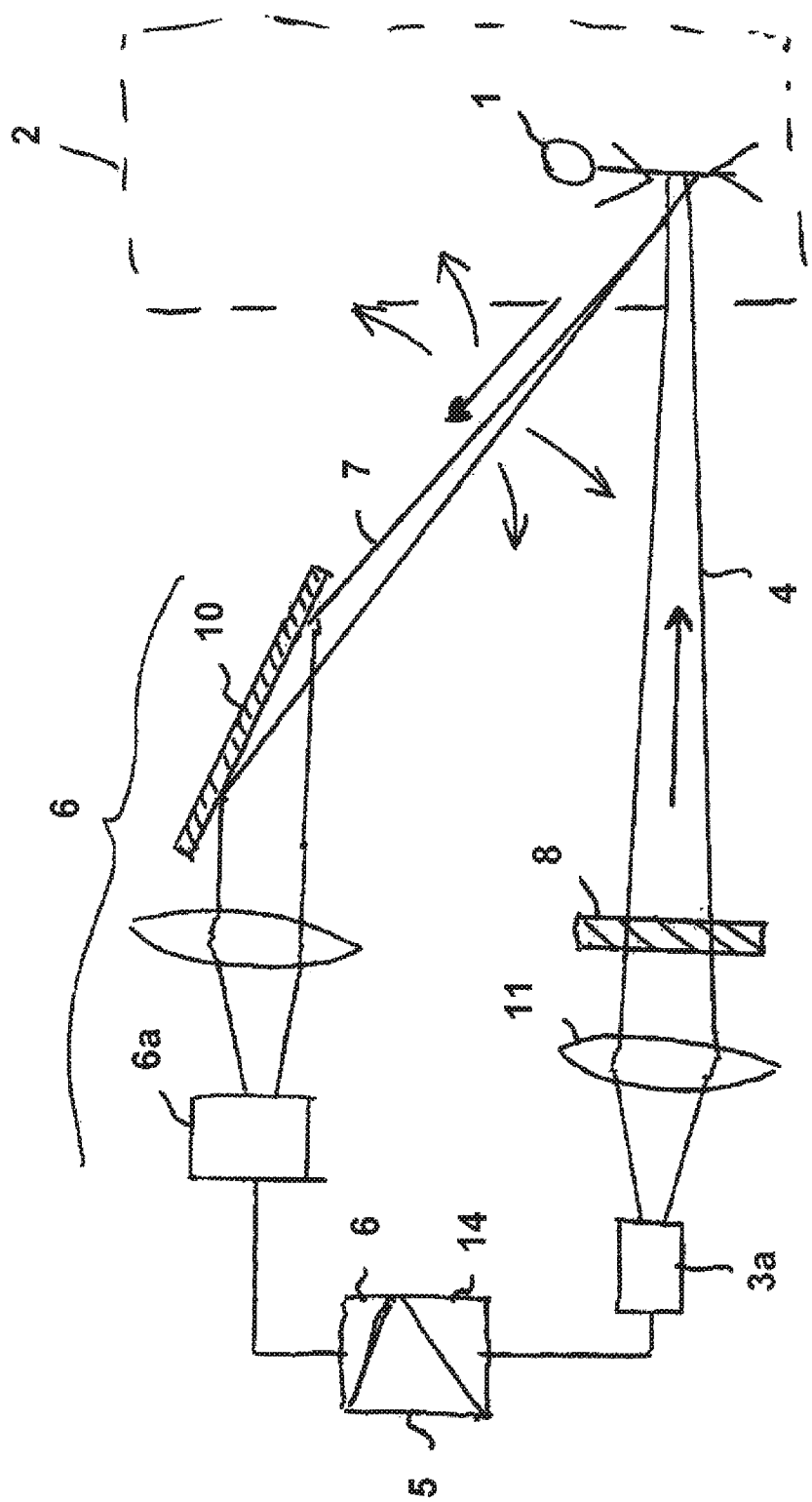

The invention is hereinafter represented by way of embodiment examples in the figures of a drawing, and explained hereinafter. Herein, there are shown in:

FIG. 1 schematically, an appliance for detecting objects in a detection region, with a radiation device and with a detection device, FIG. 2 an appliance, with which the radiation device comprises a scanner for the control of the scanning beam direction, as well as FIG. 3 an appliance, with which the detection device comprises a scanner for the control of the detection focus.

FIG. 1 shows an appliance for the detection of objects 1, for example of persons or objects, wherein this appliance can be installed for example into a headlight of a motor vehicle or be operated parallel to a headlight. The appliance comprises a radiation device 3 which can be constructed very similarly to a laser headlight, with a laser light source 3a, a collimator 11, as well as a diffusion disc 8 consisting of a transparent material and comprising phosphor compounds. The laser light from the laser light source 3a is scattered by the diffusion disc 8 and is converted into a mixture of light of different wavelengths. The light in the case of a suitable mixing appears white or yellowish-white on account of this and is scattered predominantly in the forwards direction of the scanning beam 4. The light for the most part loses its coherency and other laser light characteristics due to the scattering, so that the safety of the eyes of living beings is ensured for the greater part, behind the diffusion disc 8, i.e. for example the human eye which comes into contact with the beam is not exposed to any real danger.

If a laser light source 3a' which is arranged outside the headlight is used instead of the laser light source 3a radiating the diffusion device 8 in a direct manner, then the laser light 4' is guided by way of one or more fibre optics 21 into the headlight (light beamer) housing and onto the diffusion device. Space is saved in the headlight by way of this and the thermal loading is reduced High light intensities as a result of the use of the laser can be applied, and these permit large ranges of the scanning beam 4, due to the selection of the radiation source with a laser device 3a and a diffusion disc 8. The light can moreover be diffracted or refracted by a lens 12, in order to either achieve a predominantly parallel, unfocussed beam or a beam which is focused onto a defined distance.

The laser light source 3a is activated by way of a control device 5 which can simultaneously modulate the laser light source. Herein, a modulation can be sought by way of a temporally periodic function, for example a sine function, or also a rectifying function which can form the enveloping curve of the actual laser pulses.

An object 1 which for example can be a human or a traffic obstacle on a road, when it is hit/illuminated by the scanning beam 4, reflects the light in all directions, wherein a part of the scattered-back and reflected light 7 reaches a detector 6a. The light prior to this goes through a convergent lens 13 which can focus it onto a detector surface.

The light intensity is very small, since the reflected light is radiated from the object in different directions, so that the detector in the case that the illumination light intensity is not sufficient, must be designed in a large manner, in order to fill out an as large as possible solid angle from the object 1. If a laser light source 3a is selected for illumination, as in the present case, then a relatively small detector 6a is sufficient, and this detector for example just as the laser light source 3a can be accommodated in the housing of a light beamer, for example a motor vehicle headlight.

The modulation of the scanning light beam 4 also takes place in the reflected-back light beam 7 and is analysed in a processing device 6. It is compared with the modulation of the scanning beam 4 on a common time basis, so that phase shifts between the emitted light beam and the reflected light beam can be determined and be converted into time-of-flight (time of arrival) information of the light beam. The distance of the object 1 to the appliance with the laser light source 3a and the detection device 6a can be computed from the time-of-flight (time of arrival), given a known speed.

Basically, a system for the modulation of a scanning light beam and for the analysis of a reflected light beam with respect to the modulation and phase shift is already known in the form of so-called lidar systems.

Such systems however usually operate with laser beams, so that dangers exist concerning the safety of the eyes of persons. If the laser light intensities are reduced to the extent that these health hazards become harmless, then such a known system can no longer be applied for distance measurement over large distances, in particularly in road traffic.

It is yet to be noted that the diffusion device 8, instead of a fixed disc comprising phosphor can also comprise a gas layer or liquid layer, which is arranged between two transparent discs and comprises phosphor or a phosphor compound.

The control and processing device 5, 6, apart from the modulation device and the processing device 6 for determining the phase shift, also comprises a coding device 14 which activates the laser light source 3*a* in a manner such that the scanning beam 4 comprises coded information. This for example can be analysed and decoded by the object 1 capturing the scanning beam 4. An identity in the form of an identity number for example can be assigned to the appliance in this manner, so that the identity of the oncoming vehicle can be determined at the object 1, for example a traffic participant/car/motor vehicle. The coding can also transfer other information, such as the size or speed of a vehicle, to which the appliance is connected, so that oncoming vehicles obtain the information as to which speed a vehicle with the appliance is moving, via the scanning beam 4.

Normally, more precise positional information on an object 1 is desirable, apart from just the information that an object 1 is located in the detection region 2 and at least partly reflects the scanning beam 4. The distance of such an object 1 to the appliance can be determined with the simple system described above. However, it is also desirable to obtain information on the solid angle region, in which the object 1 is located.

FIG. 2 shows an appliance, with which the radiation source 3 comprises a scanner 9 which in a one-dimensional or two-dimensional manner permits an alignment of the scanning beam 4 and thus a selective illumination of solid angle regions of the detection region 2.

The scanning movement of the scanning beam 4 is indicated by the arrows 15, 16. The scanner 9 which can be formed for example by one or more micro-mirrors controlled by a MEMS device is activated by the control device 5. The control device 5 has information regarding the solid angle region of the detection region 2 which is presently illuminated, on account of this, and this being the case at each point in time. If a reflected light beam 7 gets back to the detection device 6*a*, then this corresponds to the information that the presently illuminated solid angle region contains a detected object 1 which reflects the scanning light beam 4. The complete detection region 2 can be scanned by the scanner 9 over the course of time in this manner, and information as to whether an object 1 is present in the solid angle segments in each case, and if this being the case, at which distance to the appliance, can be assigned to all solid angle segments.

The detection device 6*a* does not herein need to be moved, which is to say that it can be set such that it detects the reflected light from the complete detection region 2 at all times.

If the appliance has now once localised an object 1 in a solid angle segment, then it can skip this solid angle region with further scans, in order for example not to further dazzle a person in the case that he is located there. This makes particular sense if the scanning beam 4 apart from the scanning also serves for illuminating the environment, for example a vehicle.

An illumination beam of a vehicle headlight however can also be operated independently of the described appliance, wherein the radiation device 3*a*, 8 can be directly connected to the headlight. Two independent beams, of which a first is a scanning beam 4 and a second an illumination beam, can be scattered by the diffusion device 8, and scan the scanning region independently of one another. Both beams can be produced by a common laser light source 3*a* or also by two parallel laser light sources.

The illumination beam 22 for example can be produced by a laser light source 20 which is arranged outside a headlight housing 23 and be guided into the headlight housing 23 and there to the diffusion device 8, by way of a fibre optic or fibre optic bundle 21.

If an object 1 has been registered in the detection region, then the solid angle segment, in which it is located, can be skipped by the scanning beam a well as by the illumination beam on scanning.

An appliance, by way of which a detection region 2 is illuminated by way of a radiation device 3*a*, is represented in FIG. 3. The scanning beam 4 for example can be widened in a manner such that it simultaneously illuminates a larger solid angle region in the scanning region. If an object 1 is located in the detection region 2, then the light which is reflected by this in the form of the reflected beam 7 at that moment is reflected back onto the detection device 6 and detected, when the variable focussing region of the detection device brushes over the location of the object 1 by way of the scanning device 10. The precondition for the detection of the object 1 is therefore that this is simultaneously illuminated and lies in the focussing region of the detector 6*a*. The detector 6*a* is part of a detection device which also comprises a one-dimensional or two-dimensional scanner 10 in the form of one or more micro-mirrors driven by an MEMS. The detection region 2 is scanned by the scanner in a manner such that the detector 6*a* successively registers the light from different locations in the detection region 2.

The scanning beam 4 of the radiation source 3*a*, instead of a widening over the detection region, can also be controlled in a manner such that it scans the detection region as a high speed. This scanning speed for example can be very much higher than the scanning speed, at which the focussing region of the detection device 6 is changed, so that at all events, it is ensured that an object in the detection region 2 is illuminated at least once by the scanning beam 4, in the time period, during which the focussing region of the detection device stays on it.

If reflected light is detected by the detector 6*a*, then the solid angle segment, in which the object 1 is located, can be determined by the simultaneously assumed position of the scanner 10.

The distance of the object 1 to the appliance can be simultaneously determined by way of the phase comparison of the reflected light beam 7 and the emitted scanning beam 4, and thus provide a three-dimensional location evaluation of the object 1. The respective processing takes place in the processing device 5, 6. The scanning device 10 is connected to the processing device 5 for this purpose.

A laser light source 20 for an illumination beam 22 can be provided, parallel to the radiation device 3*a* for the scanning beam. Both beams 4, 22 can be scattered in the diffusion device 8, in an alternating manner or simultaneously. One or both radiation devices 3*a*, 20 can be arranged within or outside the headlight housing, wherein one or more fibre optics for the transmission of radiation into the headlight housing and to the diffusion device 8 can be provided in the case of an arrangement outside the headlight housing.

A three-dimensional evaluation of the location of an object is also possible at a large distance, for example in road traffic, at a few hundred meters distance to the vehicle, by way of the appliance according to the invention and the described method, without a free, intensive laser beam having to be used. The appliance can be connected in a similar manner to a floodlight which is used for building surveillance, or to a searchlight, or to spotlights/headlights which are applied in aviation and maritime transport.

What is claimed is:

1. An appliance for the detection of objects in a detection region, with a radiation device for emitting at least one electromagnetic scanning beam into at least a part of the detection region wherein the radiation device comprises at least one radiation source in the form of a laser light source which radiates a diffusion device scattering the radiation at least partly into the detection region and with a device for modulating the scanning beam as well as with a detection device for the detection of the scattered radiation that is reflected from at least a part of the detection region and with a device for evaluating the time response of the detected, reflected radiation in dependence on the modulation of the scanning beam, and
wherein a separate illumination radiation device is provided which likewise comprises a laser light source whose light is scattered at the diffusion device, wherein the diffusion device comprises a layer with a photo-luminescent material and is arranged in a light beamer housing.

2. The appliance according to claim 1, wherein the radiation device is configured for the selective illumination of one or more part-regions of the detection region by the scanning beam.

3. The appliance according to claim 1, wherein the radiation device is controllable in a manner such that it exclusively radiates one or more part-regions of the detection region, in a targeted manner.

4. The appliance according to claim 1, wherein an MEMS scanner is provided which drives an optical element effecting a deflection or reflection of the scanning beam from the radiation device.

5. The appliance according to claim 1, wherein the detection device is configured for the selective detection of reflected radiation from one or more part-regions of the detection region.

6. An appliance for the detection of objects in a detection region, with a radiation device for emitting at least one electromagnetic scanning beam into at least a part of the detection region and with a device for modulating the scanning beam as well as with a detection device for the detection of reflected radiation from at least a part of the detection region and with a device for evaluating the time response of the detected, reflected radiation in dependence on the modulation of the scanning beam,
wherein the radiation device comprises at least one radiation source in the form of a laser light source which radiates a diffusion device scattering the radiation at least partly into the detection region and that a separate illumination radiation device which likewise comprises a laser light source whose light is scattered at the diffusion device is provided, wherein the diffusion device comprises a layer with a photo-luminescent material and is arranged in a light beamer housing; and
wherein the detection device is controllable in a manner such that it exclusively detects reflected radiation from one or more part-regions of the detection region, in a targeted manner.

7. The appliance according to claim 6, wherein the detection device is controllable by way of an MEMS scanner for the selection of part-regions of the detection region.

8. The appliance according to claim 1, wherein the radiation device radiates the scanning beam in the form of visible light, and is part of a light beamer.

9. The appliance according to claim 1, wherein the radiation device emits the scanning light beam in the form of infrared light.

10. The appliance according to claim 9, wherein the radiation device emits a light beam in the visible wavelength region, independently of the scanning beam, and this light beam in particular is controllable, further in particular is controllable by way of an MEMS.

11. The appliance according to claim 1, wherein the radiation device comprises a laser device, in particular a laser diode.

12. The appliance according to claim 1, wherein the diffusion device comprises a layer, in particular a part-transparent solid matter layer which comprises a photo-luminescent material, in particular phosphor and/or one or more phosphor compounds.

13. A method for detecting objects in a detection region by way of emitting an electromagnetic scanning beam by way of a radiation device, the radiation device comprising at least one radiation source in the form of a laser light source which radiates a diffusion device scattering the radiation at least partly into the detection region, into at least a part of the detection region and by way of the detection of reflected radiation from at least a part of the detection region by way of a detection device and by way of modulating the scanning beam as well as by evaluating the time response of the detected, scattered radiation that is reflected in dependence on the modulation of the scanning beam, wherein a diffusion device is radiated by the one radiation source of the radiation device and the radiation is at least partly scattered into the detection region.

14. The method according to claim 13, wherein part-regions of the detection region are successively radiated in a targeted manner by a control of the scanning beam and that the reflection of radiation is simultaneously detected by the detection device.

15. The method according to claim 13, wherein the detection region is radiated by the scanning beam and that the reflection of the radiation from the detection region is simultaneously detected by the detection device in a direction-selective manner, by way of a control of the detection focus.

16. The method according to claim 13, wherein the radiation device is activated in a manner such that the scanning beam comprises coded information which in particular contains data with respect to operating parameters and/or an identity of the radiation source or of a system, in which the radiation source is integrated.

* * * * *